United States Patent [19]

Phelps

[11] 3,962,492

[45] June 8, 1976

[54] METHOD OF PROTECTING REFRACTORY LINING IN CONTAINERS FOR MOLTEN METAL

[75] Inventor: Eric Phelps, Birmingham, England

[73] Assignee: Foseco International Limited, Birmingham, England

[22] Filed: July 30, 1974

[21] Appl. No.: 493,151

[30] Foreign Application Priority Data

Aug. 16, 1973 United Kingdom............... 38752/73

[52] U.S. Cl............................... 427/204; 106/38.27; 106/38.28; 427/133; 427/419

[51] Int. Cl.$^2$........................ C21B 7/06; B29C 1/04

[58] Field of Search.................... 117/69, 5.1, 123 A; 266/43; 264/30; 427/204, 133, 419; 106/38.27, 38.28

[56] References Cited

UNITED STATES PATENTS

| | | | |
|---|---|---|---|
| 2,185,772 | 1/1940 | McMullen | 117/5.1 X |
| 2,544,598 | 3/1951 | Kalina | 106/38.27 |
| 2,618,032 | 11/1952 | Traenkner | 117/5.1 |
| 2,956,890 | 10/1960 | Casteras | 106/38.28 X |
| 3,340,082 | 9/1967 | Meyer et al. | 427/133 |
| 3,560,236 | 2/1971 | Orth | 117/123 A X |
| 3,600,480 | 8/1971 | Parsons | 264/30 |
| 3,645,767 | 2/1972 | Taylor | 106/38.28 X |

*Primary Examiner*—Ralph Husack
*Attorney, Agent, or Firm*—Cushman, Darby & Cushman

[57] ABSTRACT

Refractory linings for molten metal containers, e.g. tundishes, are protected by applying thereon first a layer comprising essentially unbonded carbonaceous particulate material and then on top of the first layer a second layer of bonded particulate material.

8 Claims, No Drawings

METHOD OF PROTECTING REFRACTORY LINING IN CONTAINERS FOR MOLTEN METAL

BACKGROUND AND SUMMARY OF THE INVENTION

This invention relates to containers for molten metal.

Many containers for molten metal are formed of a metal casing lined with refractory brick, e.g. high alumina bricks. These bricks are expensive, but as they prevent the molten metal attacking the metal casing their high cost is often justified. However, the bricks themselves are attacked, and this leads to a need to replace the bricks of the metal casing at frequent intervals, which is expensive, inconvenient and time-consuming. Monolithic linings suffer from similar disadvantages.

These disadvantages can be alleviated by applying a protective coating to the refractory lining. Coatings used up to now have not been wholly satisfactory because they have been ineffective to prevent damage to the refractory lining when skull is being removed from the vessel. Skull is solidified molten metal residue in the form of deposits adherent to the refractory lining.

According to the present invention there is provided a method of protecting a refractory lining in a molten metal container which comprises applying to the lining first a layer comprising particulate carbonaceous material, being free or substantially free from binding agent, and applying over that first layer a second layer of bonded particulate refractory material.

In this way, a duplex protective layer is produced, which acts effectively to prevent damage by skull adherence when the skull is stripped, the first layer containing the carbonaceous material acts as a parting layer enabling clean stripping of the skull, without damage to the underlying refractory lining.

The present invention may be used with all types of molten metal containers such as ladles, launders, tundishes and the like, lined with refractory bricks and with monolithic linings.

DETAILED DESCRIPTION OF THE INVENTION

The first layer applied must contain particulate carbonaceous material. A wide variety of materials are suitable such as e.g. carbon, coal, coke, charcoal, paper, sawdust, graphite. Preferably, the layer consists of a mixture of such a material with an inert particulate refractory material, for example a refractory silicate material, or a refractory oxide. Suitable inert fillers include chamotte, olivine, sillimanite, magnesia, alumina, zirconia, grog.

The thickness of the first layer may be, for example, 1–5 mm. The layer is preferably applied as a liquid composition which is sprayed, brushed or trowelled into place. In order to aid such procedures, suspending agents may be included, for example sodium carboxymethyl cellulose, which prevents the coating from "slumping" following its application.

The composition of the second layer may be selected from a wide variety of metallurgical dressings and coatings, though preferably, the second layer consists predominantly of particulate inorganic refractory material, e.g. silica flour, sand or one of those noted above for use as filler in the first layer, plus an inorganic binder. Suitable inorganic binders include silicates and phosphates of alkali or alkaline earth metals, alkali metal or alkaline earth aluminates, colloidal oxide hydrosols and clays. A preferred class of coating materials are those having a composition in the following ranges (% by weight):

| | |
|---|---|
| silica flour | 30 – 80% |
| sand | 18 – 50% |
| sodium aluminate or sodium silicate or sodium metaphosphate | 0.5– 5% |
| ball clay | 0.5 – 5% |

The thickness of the second coating may be, for example, 5–25 mm. The second coating may be applied by any convenient means, for example by trowelling.

The following examples will serve to illustrate the invention.

EXAMPLE 1

First layer:

| | | |
|---|---|---|
| coke dust (−22 mesh BSS) | 99.75% | by weight |
| sodium carboxymethyl cellulose | 0.25% | by weight |

This was mixed with water to form a paste which was applied at a thickness of 2.5 mm.

Second layer:

| | | |
|---|---|---|
| silica flour | 49.5% | by weight |
| sand | 46.5% | " |
| sodium metaphosphate | 2.0% | " |
| ball clay | 2.0% | " |

This coating was trowelled on to a thickness of 12 mm.

These two layers were applied to the refractory brick lining of a 50 tonne capacity steel casting ladle, for use in continuous casting, and were reapplied after each casting cycle. The ladle did not have to be taken out of service for replacement of the brick lining until more than 20 casting cycles had been carried out. Normally, using conventional refractory dressings, replacement of the brick lining was necessary every four or five casting cycles.

EXAMPLE 2

Equally good results were obtained using the same coating for the first layer and using for the second layer a coating composition of:

| | | |
|---|---|---|
| silica flour | 69.0% | by weight |
| sand | 28.0% | " |
| sodium aluminate | 1.5% | " |
| ball clay | 1.5% | " |

EXAMPLE 3

First layer (by weight):

| | |
|---|---|
| coke dust (−22 mesh BSS) | 99.75% |
| sodium carboxymethyl cellulose | 0.25% |

This was mixed with water to form a paste which was applied at a thickness of 2.5 mm.

Second layer (by weight):

| | |
|---|---|
| silica flour | 69.0% |
| sand | 28.0% |
| sodium aluminate | 1.5% |

-continued

| | |
|---|---|
| ball clay | 1.5% |

This coating was applied at a thickness of 20 mm.

These two layers were applied to the refractory brick lining of a continuous casting tundish 4 meters long × 1 meter deep × 0.8 meter wide for use in casting metal continuously in the form of slabs. The protective coating layers were reapplied prior to each casting cycle.

The typical life of the brickwork untreated was about 15–20 cycles. Furthermore, difficulties with the removal of the solidified skull was often experienced. By use of these protective coating layers the refractory brick lining survived for 100 cycles without repair and without damage during removal of the solidified skull.

The present invention includes, in addition to the method noted above, and containers with linings protected thereby, packaged products useful for carrying out the method and comprising a first lining material consisting essentially of particulate carbonaceous material and being free or substantially free from binding agent, a second lining material comprising particulate refractory material and a binding agent therefor, and instructions for carrying out the method of the invention.

I claim as my invention:

1. A method of protecting a refractory lining in a container for molten metal, said method comprising the steps of applying to substantially the entire refractory lining a first layer consisting essentially of particulate carbonaceous material and being at least substantially free of binding agent, and applying a second layer over said first layer so that a duplex layer protects said lining, said second layer consisting essentially of bonded particulate refractory material.

2. The method of claim 1 wherein the first layer additionally contains particulate refractory material.

3. The method of claim 1 wherein the first layer is 1–5 mm thick.

4. The method of claim 1 wherein the second layer consists of, by weight:

| | |
|---|---|
| silica flour | 30 - 80% |
| sand | 18 - 50% |

binding agent selected from the class consisting of

| | |
|---|---|
| sodium aluminate, sodium silicate and sodium metaphosphate | 0.5% - 5% |
| ball clay | 0.5% - 5%. |

5. The method of claim 1 wherein the second layer is 5–25 mm thick.

6. The method of claim 1 wherein said first layer consists essentially of a material selected from carbon, coal, coke, charcoal, paper, sawdust, or graphite.

7. The method of claim 6 wherein said first layer additionally contains particulate refractory material.

8. The method of claim 6 wherein the second layer consists of, by weight:

| | |
|---|---|
| silica flour | 30 - 80% |
| sand | 18 - 50% |

binding agent selected from the class consisting of

| | |
|---|---|
| sodium aluminate, sodium silicate and sodium metaphosphate | 0.5% - 5% |
| ball clay | 0.5% - 5%. |

* * * * *